United States Patent

[11] 3,625,820

| [72] | Inventors | Douglas M. Gluntz<br>Campbell;<br>Robert H. Moen, San Jose, both of Calif. |
|---|---|---|
| [21] | Appl. No. | 737,090 |
| [22] | Filed | June 14, 1968 |
| [45] | Patented | Dec. 7, 1971 |
| [73] | Assignee | General Electric Company |

[54] JET PUMP IN A BOILING WATER-TYPE NUCLEAR REACTOR
3 Claims, 4 Drawing Figs.

[52] U.S. Cl. .................................................... 176/54, 103/278
[51] Int. Cl. ........................................................ G21c 15/24
[50] Field of Search .......................................... 176/54, 56, 61; 103/258, 277, 278, 271

[56] References Cited
UNITED STATES PATENTS

| 217,109 | 7/1879 | Irwin | 103/278 |
| 2,184,573 | 12/1939 | Walch | 103/277 |
| 3,255,708 | 6/1966 | Williams | 103/258 |
| 3,274,065 | 9/1966 | Kierulf et al. | 176/61 |
| 3,371,618 | 3/1968 | Chambers | 103/258 |
| 3,378,456 | 4/1968 | Roberts | 176/61 |
| 3,445,335 | 5/1969 | Gluntz | 176/54 |

OTHER REFERENCES

Univ. Of California Publications in Engineering, Vol. 3, No. 3 (1934) (an article by Gosline et al.) pp. 167, 168, 169, 170, 171, 172, 176, 177, 181, 189

*Primary Examiner*—Reuben Epstein
*Attorneys*—Ivor J. James, Jr., Samuel E. Turner, John R. Duncan, Frank L. Neuhauser, Oscar B. Waddell and Melvin M. Goldenberg

ABSTRACT: An improved jet pump for a nuclear reactor is disclosed. A combination of novel nozzle, mixer and diffuser configurations give a jet pump of uniquely high efficiency. This jet pump is especially useful in circulating cooling water through a boiling water-type nuclear reactor.

INVENTOR
DOUGLAS M. GLUNTZ
ROBERT H. MOEN
BY John R Dunran
ATTORNEY

JET PUMP IN A BOILING WATER-TYPE NUCLEAR REACTOR

BACKGROUND OF THE INVENTION

Conventional jet pumps include a body having three distinct regions, namely a converging inlet section, a mixer section of substantially uniform cross-sectional area throughout its length and a diffuser section which diverges or increases in cross-sectional area in the flow direction. If desired a short tailpipe having a uniform cross-sectional area equal to the cross-sectional area of the diffuser exit may be included on the end of the diffuser. A nozzle is positioned in the inlet section to convert a high-pressure stream of driving fluid into a high-velocity, low-pressure jet of driving fluid which flows axially through the inlet section and into the mixing section of the jet pump body. The high-velocity jet entrains fluid surrounding the nozzle in the inlet section as well as in the entrance region of the mixer section by momentum transfer, thereby continuously inducing the surrounding or "driven" fluid into and through the inlet section. The velocity of the entrained driven fluid increases due to the decreasing cross-sectional flow area as the fluid moves through the converging inlet. Thus, the pressure of the combined driving and driven fluids are reduced to a low value. The converging inlet section surrounding the nozzle directs the driven fluid into the mixing section. Within the mixing section, the high-velocity jet of driving fluid gradually widens as an entrainment-mixing process takes place with the driven fluid. During mixing, momentum is transferred from the high-velocity driving stream to the driven fluid, so pressure of the combined stream increases. The mixing process ends, in theory, after the longitudinal velocity across an area perpendicular to the longitudinal axis becomes nearly constant except in the boundary layer close to the walls. When this occurs, it is said that a nearly flat velocity profile has been attained. Generally, it is assumed that the flat profile occurs shortly after the jet expands to touch the walls of the mixing section. From the mixing section, the mixed driving and driven fluids flow into a diffuser of increasing cross-sectional area in the flow direction, further increasing pump pressure as the velocity of the mixed fluids is further reduced.

Thus, a jet pump operates on the principle of the conversion of momentum to pressure. The driving fluid from the nozzle has low pressure, but high velocity and momentum. By a process of momentum exchange, driven fluid from the inlet or suction section is entrained and the combined flow enters the mixing section where the velocity profile, i.e., a curve showing fluid velocity as a function of distance from the longitudinal axis of the mixing section, is changed by mixing so that momentum decreases and the velocity profile becomes nearly flat, i.e., perpendicular to the longitudinal axis of the mixing chamber. The decrease in momentum results in an increase in fluid pressure. The flat velocity profile gives minimum momentum with a resulting highest pressure increase in the mixing section. Also, the boundary layer between the flowing main portion of the fluid and the chamber wall should be as thin as possible to permit optimum performance of the diffusing section which follows the mixing section. In this outwardly diverging diffuser, the relatively high velocity of the combined stream is smoothly reduced and converted to a still higher pressure.

In jet pumps, as in other hydraulic machinery, flow pulsations occur, generated either within the equipment or from adjacent equipment. It is important that these pulsations be kept to low amounts, since pulsating jet pumps generate flow induced vibrations which may cause loosening of bolts, fatigue stresses, etc., in related equipment. Where several jet pumps are ganged together to discharge into a common plenum, a condition of resonance involving flow induced pulsations must be prevented. Thus, overall design of a jet pump system must be such as to limit and damp-out flow pulsations.

Jet pumps are useful in many systems pumping large quantities of fluid at high rates. Thus, small improvements in pump performance can have major effect on system performance and economy. One application for which jet pumps are especially suited is the recirculation of coolant in a nuclear reactor of the boiling water type. Jet pumps are also suitable for pumping many fluids, such as water, gases, liquid metals, liquids carrying suspended solid particles, etc. In a typical large nuclear power reactor, about 270,000 gallons/minute of coolant is recirculated by means of jet pumps. Thus, it is apparent that small increases in jet pump efficiency will produce important improvements in system performance and economy.

SUMMARY OF THE INVENTION

It is, therefore, an object of this invention to provide improved jet pumps.

Another object of this invention is to provide an improved nozzle configuration for use in jet pumps.

Another object of this invention is to provide an improved mixing section for jet pumps.

Another object of this invention is to provide an improved diffuser section for jet pumps.

Still another object of this invention is to provide a jet pump assembly of higher energy conversion efficiency.

Still another object of this invention is to provide a jet pump assembly of superior performance stability with respect to flow pulsations.

The above objects, and others, are accomplished in accordance with this invention by providing a jet pump having a nozzle of improved configuration, located at an optimum position within an inlet of improved configuration, a mixer section having an optimum length-to-diameter ratio, and an optimized diffuser with, if desired, tailpipe section, all of which cooperate in a unique manner to make up a pump of exceptionally high efficiency.

Jet pump efficiency "E" is defined as the product of the flow ratio "M" multiplied by the head ratio "N." The flow ratio is the ratio of driven or suction flow rate divided by the driving flow rate through the nozzle. Flow ratio is calculated from the equation $M=W_2/W_1$, wherein $W_2$ is weight flow rate of driven fluid and $W_1$ is the weight flow rate of driving fluid. The head ratio is the ratio of differential head produced in the driven fluid through the jet pump action, divided by the differential head possessed by the driving flow at the nozzle. This head ratio is calculated using the equation:

$$N=\frac{\overline{P}_d-\overline{P}_s}{\overline{P}_1-\overline{P}_d}$$

wherein $N$ is the head ratio, $\overline{P}_d$ is the downstream stagnation pressure at the pump exit, $\overline{P}_s$ is the upstream stagnation pressure in the driven or suction fluid before it reaches the pump inlet, and $\overline{P}_1$ is the upstream stagnation pressure in the driving fluid in the nozzle supply pipe ahead of the nozzle. Thus, efficiency in percentage values is calculated from the equation $E=M\times N\times 100$. While this definition differs from conventional definitions of efficiency, it is conventional in jet pump technology, since it clearly points out the relative effectiveness of comparable jet pumps.

BRIEF DESCRIPTION OF THE DRAWINGS

Details and various preferred embodiments of the present invention will become apparent upon reference to the drawings, wherein.

DETAILED DESCRIPTION OF THE INVENTION

Figure 1B:
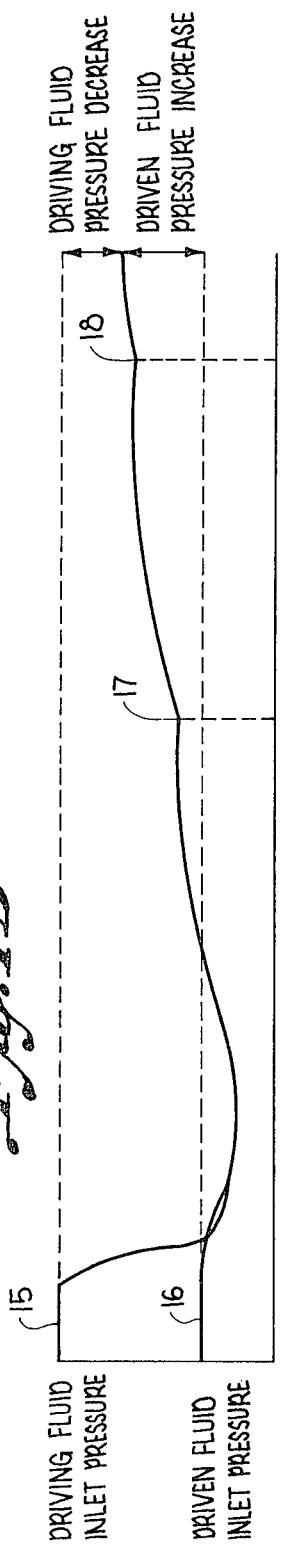
FIGS. 1A and 1B show a schematic representation of a longitudinal section through a jet pump according the pump; this invention, together with plot of pressure variations through the pump.
Figure 1A:
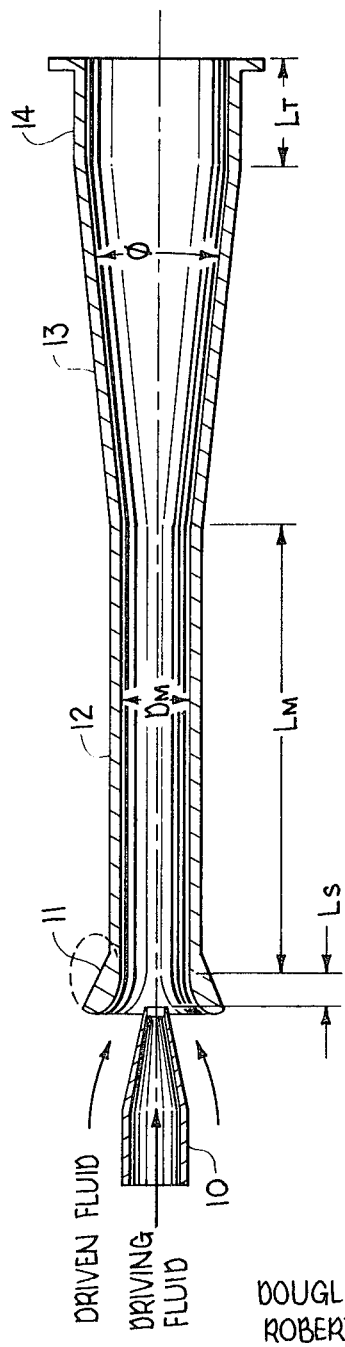

Referring now to FIGS. 1A and 1B, there is seen a section through a jet pump according to this invention. This pump is made up, basically, of a nozzle 10, a converging inlet section 11, a cylindrical mixer section 12, a diverging diffusing section 13 and a cylindrical tailpipe 14.

The distribution of pressure within the nozzle and pump body for the driving fluid and the driven fluid are shown approximately by curves 15 and 16, respectively, plotted along appropriate portions of the jet pump. Driving fluid enters nozzle 10 at a relatively high pressure and low velocity. The fluid leaves the nozzle at substantially reduced pressure and high velocity due to decreased nozzle diameter at the outlet. This high-velocity driving stream entrains driven or suction fluid. The movement of the driven fluid into the converging inlet section results in low pressure at the inlet to the mixing section, which results in flow of the driven fluid into the mixing section.

The jet from nozzle 10 gradually diverges and mixes with the driven fluid. As momentum is transferred from the driving fluid to the driven fluid, the combined pressure continues to increase. Finally, the jet from nozzle 10 has widened until it touches the interior wall of mixing section 12. For highest efficiency, this should occur at the line where mixing section 12 joins diffusing section 13. If the jet first contacts the wall of mixing section 12 well before this line, efficiency will decrease due to increased friction along the remainder of the wall of mixing section 12. However, there is an even greater loss in efficiency if this jet does not contact the mixing section wall, but extends out into the diffusing section, due to incomplete mixing of the driving and driven fluids and poor diffuser inlet conditions. Therefore, it is better practice to make mixing section 12 slightly longer than optimum to make sure that the jet from nozzle 10 contacts the wall of mixing section 12 before it reaches diffusing section 13.

As can be seen as the curve approaches point 17, the pressure no longer increases rapidly, since mixing has been completed. As the combined fluids enter diffusing section 13, pressure again increases, due to momentum transfer from the smoothly decelerating fluid. The pressure rise slows as the fluid reaches the end of an optimum diffuser as indicated at point 18. It has been found that the addition of a tailpipe 14 of optimum length to diffuser will result in a slight further increase in pressure as the fluid flow is smoothed and further slowed.

Many of the dimensions of the high-efficiency jet pump of this invention can be related to the inside diameter of the mixing section, "$D_M$." For example, it has been found that a flow ratio of from about 1 to about 2.5, and water temperature of from about 400° to about 650° F., the ratio of mixer section length ($L_M$) to mixer section diameter ($D_M$) should preferably be from about 9.5:1 to about 18:1. Within the above ranges, optimum $L_M/D_M$ ratios can be obtained for given flow ratios and water temperatures. Typically, at about 530° F. and a flow ratio of about 1, the optimum $L_M/D_M$ ratio has been found to be about 11, while at a temperature of about 530° F. and a flow ratio of about 2, the optimum $L_M/D_M$ ratio has been found to be about 13.5.

Other factors being held constant, it has been found that the jet pump efficiency decreases typically about 2 percentage points when the mixer section is 25 percent longer than optimum, and about 4 percentage points when the mixer section is about 25 percent shorter than optimum. Where the mixer section is shorter than optimum, the loss is much greater than where it is longer than optimum since the effect of incomplete mixing in the short section is greater than that of increased friction losses in the longer section. Outside the $L_M/D_M$ ranges given above, efficiency losses are severe. Thus, it is highly desirable that the optimum $L_M/D_M$ ratio be chosen for a given pump application within this range.

Also of major importance is alignment of the nozzle with the mixer and diffuser sections. Preferably, eccentricity of the centerlines of the nozzle and mixer sections should be no more than 0.05 $D_M$, with optimum efficiency where this eccentricity is no more than 0.02 $D_M$. The angular misalignment of the nozzle centerline with the diffuser centerline should be no more than 1°; preferably no more than 0.1°. Eccentricity of the mixer and diffuser centerlines should be no more than 0.02 $D_M$; preferably no more than 0.002 $D_M$. Alignment errors exceeding these limits tend to cause the one side of the expanding jet from the nozzle to strike the wall of the mixer section well before the mixer-diffuser boundary, while the other side does not reach the mixer wall. Thus, the velocity profile of the fluid as it enters the diffuser is distorted, severely adversely affecting diffuser performance. Other factors being held constant, it has been found that misalignment beyond the above indicated ranges may easily cause an efficiency decrease in excess of 5 percentage points.

In the diffuser section, highest overall pump efficiency has been obtained where the ratio of diffuser exit cross-sectional area to entrance area is in the range of about 7:1 to about 5:1 and the included angle Φ is from about 5° to about 8°. With water at a temperature of from about 400° to about 650° F. and a flow ratio of from about 1 to about 2.5, optimum results have been obtained with an area ratio of about 6:1 and an included angle Φ of about 6°. Other factors being held constant, it has been found that jet pump efficiency decreases by several percentage points where diffuser proportions are outside these ranges.

The overall efficiency of the jet pump has been found to be further increased by up to about 0.8 percentage points by the addition of a tailpipe, preferably having a length ($L_T$) of from about 2.5 to about 15 times the diameter of the mixing section ($D_M$).

The configurations of nozzle 10 and inlet section 11 also have a major effect on pump efficiency. These sections are shown in detail in FIG. 2.

Nozzle 10 consists of a pipe having a converging end having the internal configuration of a truncated cone leading to a right circular cylinder of short length. The nozzle is coaxial with the inlet, mixer, diffuser and tailpipe sections.

For flow ratios of from about 1 to about 2.5, the ratio of nozzle diameter ($D_N$) to mixer section diameter $D_M$) should be from about 0.53 to about 0.30. Varying nozzle diameter has, of course, a direct effect on the flow ratio at which peak efficiency is attained by the jet pump.

To insure minimized entrance losses and/or minimized deviations of nozzle exhaust velocity profile away from a preferred essentially uniform velocity profile, the diameter ($D_P$) of the feed pipe 19 should be at least twice the nozzle diameter ($D_N$).

The exterior angle θ and the interior angle Ψ FIG. the converging nozzle section have a major influence on pump efficiency. Preferably, exterior angle θ should be between about 14° and about 50°, and interior angle Ψ should be between about 4° and about 30°. Exterior angle θ should usually be greater than interior angle Ψ. The nozzle walls should have sufficient thickness to withstand corrosion over the life of the pump, to provide the necessary strength, and to prevent vibration. Of course, if the walls are unnecessarily thick, weight and handling problems and cost increase. Nozzle wall thickness may be varied either by changing the relative interior and exterior angles, or by changing the length of the short cylindrical inlet section shown at 20 in FIG. 2. Optimum results have been obtained with exterior angle θ at about 22° and interior angle Ψ at about 15°. Where the interior angle is less, there are increased friction losses in the nozzle, while greater exterior angles cause turning losses in the driven fluid entering the inlet around the nozzle.

It is highly desirable that a short cylindrical section 20 be included at the nozzle exit opening. Preferably, this cylindrical section length ($L_C$) should be from about 0.1 to about 0.3 multiplied by the diameter of the nozzle opening ($D_N$). Optimum results have been obtained where the ratio of $D_N$ to $L_C$ is about 0.25. A longer cylindrical section 20 tends to increase friction losses, while a shorter section may provide insufficient material to retain originally manufactured dimensions in the event that material erosion processes are present during the intended lifetime of the pump.

Also, it is preferred that a blunt edge 21 be provided around the nozzle opening. Preferably, this edge has a thickness of from about 0.01 to about 0.20 inch, with optimum results at about 0.05 inch. If this edge is too thick, turbulence is promoted at the nozzle tip, while too thin an edge provides too little material to withstand potential material losses from erosion, as well as fail to provide sufficient strength to resist flow-induced surface vibrations.

Figure 2:
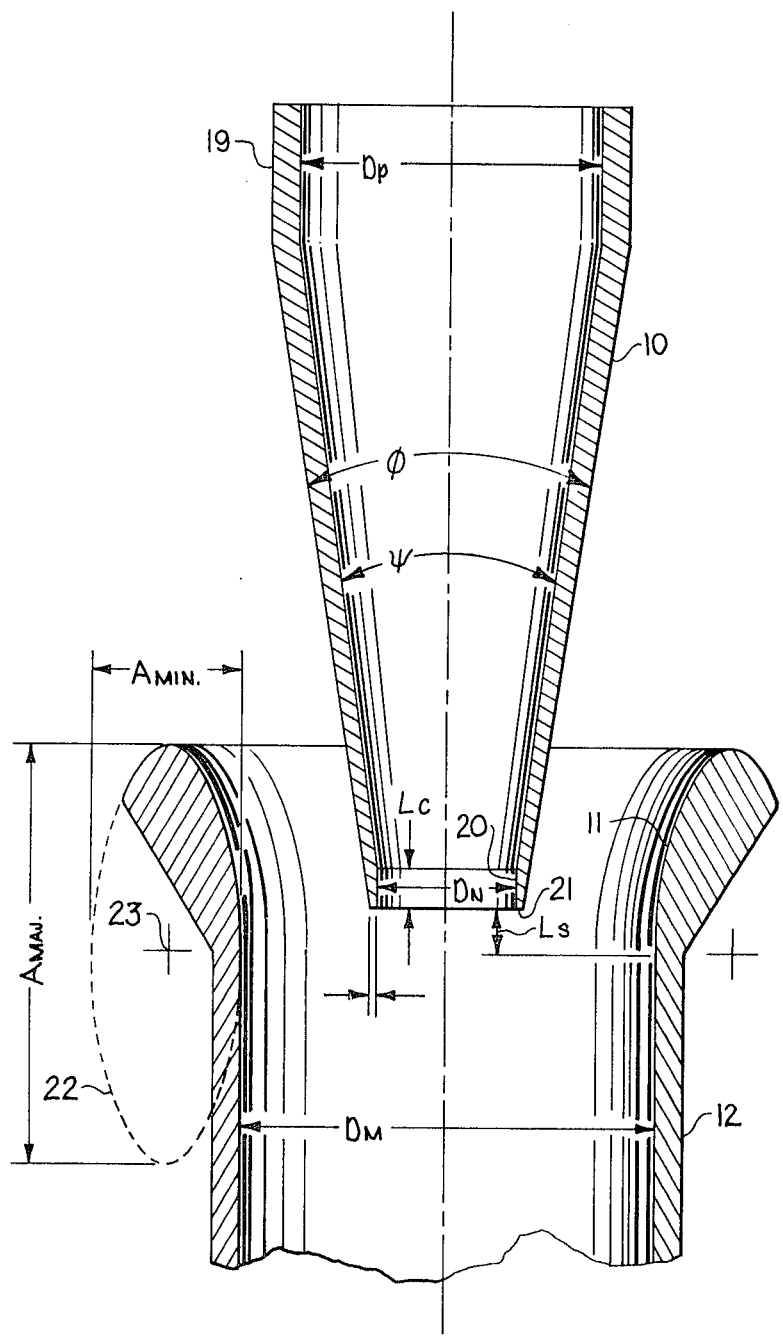
FIG. 2 shows a schematic detail view of the nozzle and inlet portions of the jet pump of this invention.

Other factors being held constant, it has been found that the nozzle shown in FIG. 2 gives about a 2–3 percentage point increase in jet pump efficiency over conventional nozzles having a relatively long cylindrical interior section, thick walls and relatively high-exterior angle.

Properly locating nozzle 10 with respect to inlet section 11 is very important in promoting high-pump efficiency. If the nozzle projects too far into the inlet, flow of driven fluid around the nozzle through the inlet is unnecessarily choked. If the nozzle is spaced too far out of the inlet, the jet of driving fluid from the nozzle expands too rapidly and does not mix well with the driven fluid. In fact, a "fluid choking" effect may occur, limiting severely the amount of driven fluid which enters the pump. Good results have been obtained where the nozzle end is spaced from the beginning of the cylindrical mixer section by about zero to about two times the mixer section diameter ($D_M$). Best results have occurred where the ratio of this spacing to $D_M$ is about 0.1 for flow rates of about 1 and 0.5 for flow rates of about 2.5. It has been found that jet pump efficiency decreases rapidly where the spacing is outside the above range. For example, it has been found that increasing this spacing by only about 0.8 $D_M$ can cause a loss in efficiency of more than 3 percentage points.

Generally, jet pump inlets of the prior art have used a conical converging arrangement. It has now been found, however, that higher pump efficiency can be obtained where the inlet section wall has an elliptical cross section. This configuration permits the driven fluid to flow more smoothly into the pump body. Such a geometry prevents flow separation from the walls of the inlet, which frequently occurs with a design which fails to provide the smooth transition between inlet and mixing sections offered by elliptical transition geometry. In FIG. 2 this elliptical cross section is schematically shown by dashed line 22, with the ellipse center at 23. Best results have been obtained where this ellipse has a major axis ($A_{maj}$) of about equal to the mixer section diameter ($D_M$) and a minor axis ($A_{min}$) of at least about 0.36 multiplied by the mixer section diameter. It has been found that substituting this inlet shape for the prior conical inlets results in an efficiency increase of at least 1 percentage point.

The surface finish on the internal nozzle and pump body surfaces is important. Preferably, these surfaces should be hydraulically smooth under the flow conditions used. Good results are obtained where the effective surface roughness is less than about 63 microinches (r.m.s.), with best results where effective roughness is less than about 24 microinches (r.m.s.). It has been found that roughness appreciably exceeding this upper limit may cause an efficiency loss of more than 10 percentage points.

Jet pumps constructed with parameters in the above ranges have in general very high-pumping efficiency, relative to prior jet pumps. These pumps have been found to produce very good flow pulsation stability. Optimum figures within these ranges may be selected by one skilled in the art to provide the most efficient pump for a particular set of fluid flow rate and temperature conditions.

Figure 3:
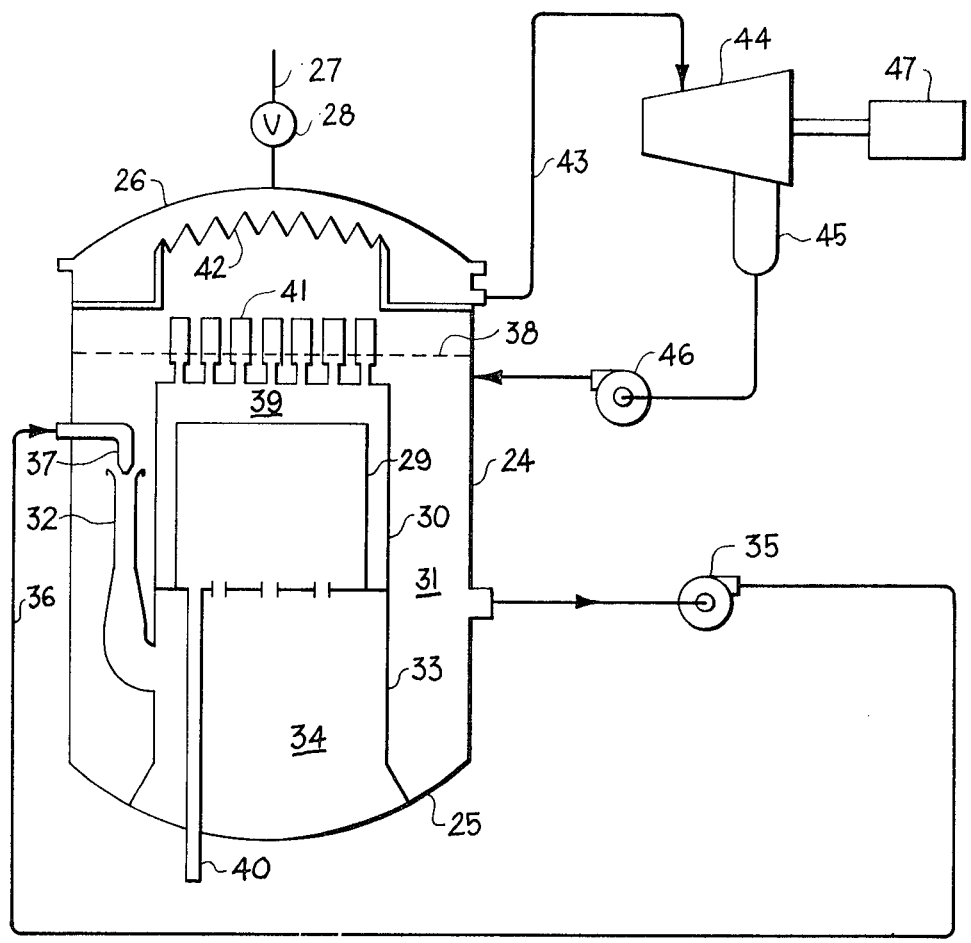
FIG. 3 shows a schematic elevation of the jet pump of this invention mounted in a boiling water nuclear reactor.

Pumps of the sort described above are especially useful in nuclear power plants of the boiling water type, such as is shown schematically in FIG. 3.

As shown in FIG. 3, the reactor is enclosed in an upright cylindrical pressure vessel 24, closed at its lower end by a dish-shaped bottom head 25 and having a dome-shaped removable top head 26. A vent pipe 27 in top head 26 is normally closed by valve 28. A conventional reactor core 29 is located within a core shroud 30 mounted coaxially within pressure vessel 24 so that an annular downcomer space 31 is formed between shroud 30 and pressure vessel 24. An upright jet pump 32 is mounted in downcomer space 31 with the discharge end of the pump penetrating a cylindrical shroud support skirt 33. While more than one jet pump will ordinarily be used, only one is shown in FIG. 3 for clarity. Generally cylindrical shroud skirt 33 is secured to the bottom of core shroud 30 and pressure vessel head 25 to form a feedwater plenum 34. Driving fluid is supplied to jet pump 32 by recirculation pump 35 through line 36 connected to nozzle 37 at the inlet end of pump 32. A high-velocity waterstream is directed by nozzle 37 into the pump inlet to induce the flow of driven water from a pool of water in the downcomer space and drive it into plenum 34. Water is maintained in pressure vessel 24 at a level indicated by dashed line 38 above the inlet end of the jet pump.

Water is forced through reactor core 29 where it extracts heat and a portion of the water is flashed into steam which passes up into a steam plenum 39 above the reactor core. The quantity of heat generated in core 29 is controlled in part by control rods, one of which is shown at 40.

A mixture of water and steam passes upwardly through steam separators 41 and steam dryers 42. Water returns to downcomer space 31 while steam leaves the pressure vessel through steam line 43 to turbine 44. Steam leaving the turbine is condensed in condenser 45 and the condensate is returned by pump 46 to the reactor. The turbine may drive electrical generator 47, or the steam produced in the reactor may be used for any other purpose. In a typical reactor such as that shown in FIG. 3, which produces about 600 MWE, it is desirable to circulate about $72 \times 10^6$ pounds of water per hour. Thus it is apparent that small increases in jet pump efficiency will produce important savings in the size of and power requirements of recirculation pumps such as pump 35 in FIG. 3.

The following example further points out the advantages of the jet pump of this invention having optimum nozzle, inlet, mixer, diffuser and tailpipe arrangements.

DESCRIPTION OF A PREFERRED EMBODIMENT

A jet pump is constructed as shown in FIG. 1A and 1B. The pump body includes a converging inlet section having an elliptical cross section with a major axis of about 6.8 inch and a minor axis of about 2.18 inch, a cylindrical mixer section having an internal diameter of about 6.8 inches and a length of about 81.5 inches, followed by a diverging diffusing section having an outlet diameter of about 16.75 inches and an enclosed angle of about 6°, and finally a tailpipe having a length of about 17.0 inches. Coaxial with the pump body is located a nozzle, spaced about 2.96 inches from the beginning of the mixing section. The feed pipe to the nozzle has an internal diameter of about 7 inches. The nozzle opening has an internal diameter of about 3.4 inches. The enclosed angle of the inner wall of the nozzle is about 15° and of the outer wall is about 22°. The short cylindrical inner wall at the nozzle opening has a length of about 1.3 inches. The edge thickness at the nozzle opening is about 0.05 inch. This jet pump is operated in water at a temperature of about 530° F., with a flow rate of about 1.2.

The efficiency of this pump is found to be better than about 45 percent.

In a typical power plant such as is shown in FIG. 3, the net electrical power generated is about 600 MWE. In the boiling water reactor, total cooling waterflow through the core is about $73.5 \times 10^6$ pounds per hour. Of this, about $10.24 \times 10^6$ pounds per hour leaves the reactor as steam, with the remainder recirculated. Steam is produced at a pressure of about 1,020 p.s.i. and a temperature of about 545° F. At a ratio of driven flow to driving flow of about 1.2, about 34.2×10⁶ pounds per hour of water is pumped through the circulation pumps, 98 percent of which flows to a manifold which directs the water to the jet pump nozzles. The water reaches the nozzle section at a pressure of about 118 p.s.i. above the pressure of the surrounding downcomer fluids and a temperature of about 532° F. Twenty jet pumps as described above are arranged in parallel in the annular space between the reactor core and the pressure vessel. Each pump produces about 3.68×10⁶ pounds per hour total flow. These highly efficient pumps permit the use of fewer jet pumps and a smaller capacity recirculation pump than was possible previously.

Although specific proportions and arrangements have been described in the above description of a preferred embodiment, these may be varied within the ranges given above, depending on specific conditions, with similar results. Also, the jet pumps of this invention may be used in other systems and to pump other fluids, as indicated above, in addition to the preferred use in boiling water reactors.

Other modifications and ramifications of the invention will become apparent to those skilled in the art upon reading the present disclosure. These are intended to be included within the scope of this invention.

We claim:

1. In a heat-generating reactor apparatus comprising a nuclear chain-reacting core having an inlet and an outlet through which cooling water flows to be heated, said water having an inlet temperature of from about 400° to about 650° F.; and a pump for circulating the cooling water through said core at a ratio of driven water to driving water of from about 1 to about 2.5; the improvement comprising circulating said water with a jet pump having a mixer section with a ratio of length to diameter of from about 10.5 to about 13.5, and a diverging diffuser section downstream of said mixer section having a diffuser section length equal to about 10.5 multiplied by the mixer section diameter and an included angle of about 6°.

2. In a heat-generating reactor apparatus comprising a nuclear chain reacting core having an inlet and an outlet through which cooling water flows to be heated, said water having an inlet temperature of from about 400° to about 650° F.; and a pump for circulating the cooling water through said core at a ratio of driven water to driving water of from about 1 to about 2.5; the improvement comprising circulating said water with a jet pump having a mixer section with a ratio of length to diameter of from about 10.5 to about 13.5; said jet pump including a nozzle directing a driving fluid into said mixing section through an inlet section, said nozzle having a converging generally conical configuration with an opening having a diameter of about 0.30 to about 0.53 multiplied by the diameter of said mixing section; said opening located substantially on the centerline of said mixing section at a distance of up to twice the mixing section diameter from the beginning of said mixing section; the angle included by the exterior walls of said converging section of said nozzle being from about 14° to about 50° and the angle included by the interior walls of said converging section being from about 4° to about 30°; the interior wall of said nozzle having a right circular cylindrical internal surface having a length of about 0.1 to about 0.3 multiplied by the diameter of said nozzle opening; and an edge at the nozzle opening with a surface substantially perpendicular to the nozzle axis, the edge having a thickness of from about 0.01 to about 0.20 inch.

3. In a heat-generating reactor apparatus comprising a nuclear chain reacting core having an inlet and an outlet through which cooling water flows to be heated, said water having an inlet temperature of from about 400° to about 650° F.; and a pump for circulating the cooling water through said core at a ratio of driven water to driving water of from about 1 to about 2.5; the improvement comprising circulating said water with a jet pump having a mixer section with a ratio of length to diameter of from about 10.5 to about 13.5; said jet pump including a converging inlet section the wall of which has a cross section in the form of at least a portion of a true ellipse with the minor axis of said ellipse substantially perpendicular to the centerline of said mixer section at the beginning of said mixer section, said ellipse having a major axis about equal to the mixer section diameter and a minor axis of about 0.36 multiplied by the mixer section diameter.

* * * * *